INVENTORS
WILL H. ROWAND
DE CARR C. BRADDY
BY
ATTORNEY

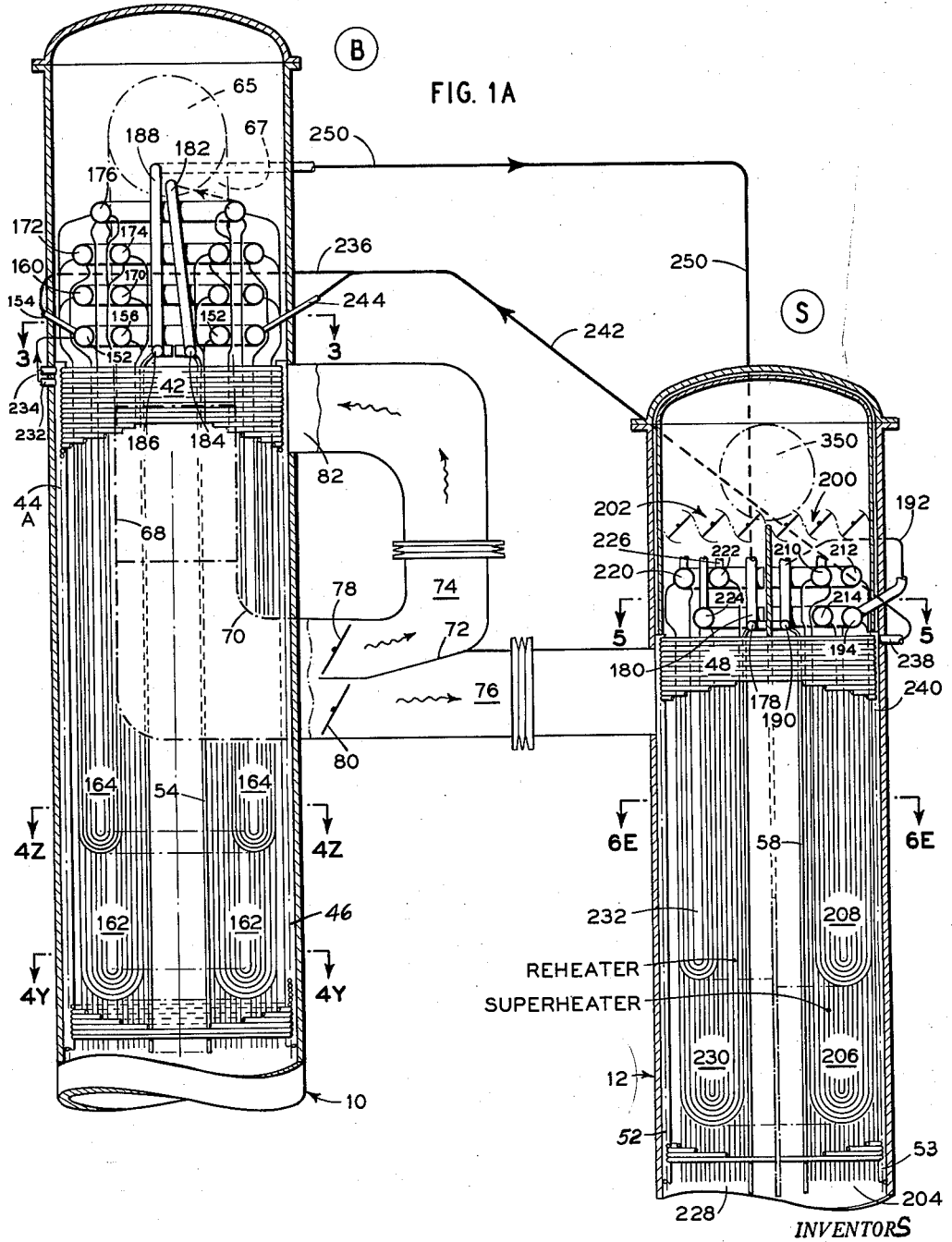

FIG. 3
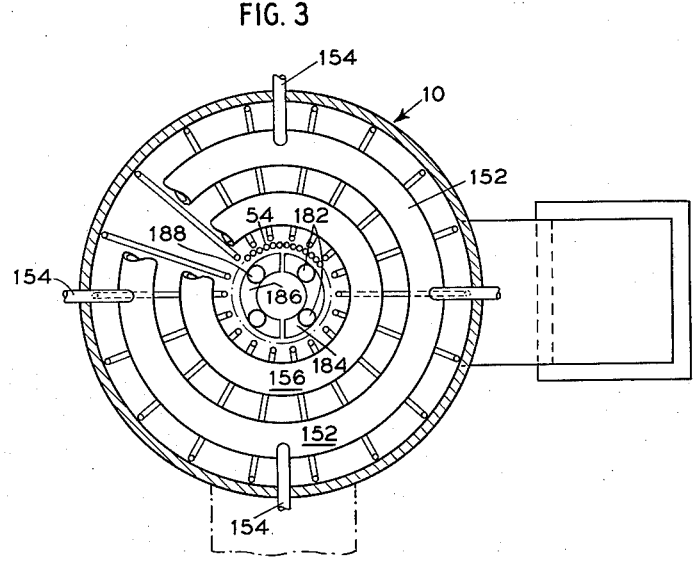
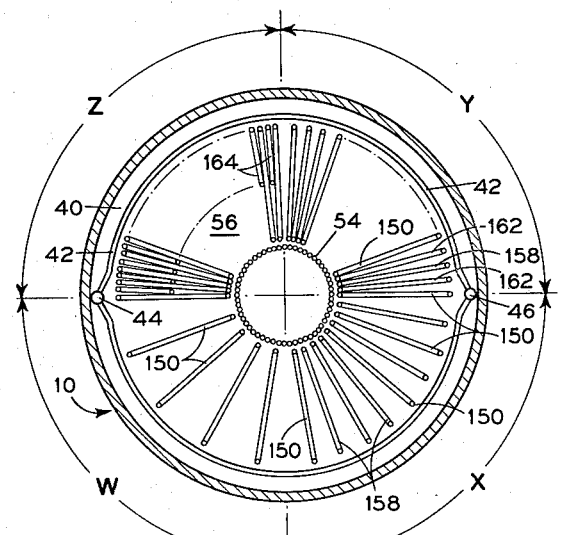
FIG. 4

May 2, 1961 W. H. ROWAND ET AL 2,982,266
BINARY FLUID POWER PLANT AND METHOD OF OPERATING THE SAME
Filed March 10, 1955 9 Sheets-Sheet 5

INVENTORS
WILL H. ROWAND
DE CARR C. BRADDY
BY
ATTORNEY

2,982,266
Patented May 2, 1961

2,982,266

BINARY FLUID POWER PLANT AND METHOD OF OPERATING THE SAME

Will H. Rowand, Short Hills, N.J., and De Carr C. Braddy, Jamaica Estates, N.Y., assignors to The Babcock & Wilcox Company, New York, N.Y., a corporation of New Jersey Filed Mar. 10, 1955, Ser. No. 493,364

9 Claims. (Cl. 122—478)

This invention relates to a method of and apparatus for the simultaneous generation of highly superheated high pressure vapor and high temperature and pressure gases for use in the production of power by a binary fluid power plant.

In another sense, the invention relates to a steam generator including separate shop-assembled units collectively containing the major steam generator components such as a furnace, steam generating tubes, a steam superheater, and a feedwater heater or economizer.

In a more particular sense, the invention may be said to relate to a method of, and apparatus for, producing power in which steam generating and steam superheating zones are separately pressure fired at super-atmospheric combustion gas pressures, the utilization of the high pressure combustion gases from the superheating zones to develop power by the expansion of the combustion gases in a gas turbine zone, the simultaneous kinetic utilization of the superheated steam to produce power in a separated power zone, and the use of gas recirculation in the steam generating and steam superheating zones, together with the regulation of said pressure firing to maintain such conditions of gas temperature and gas flow at the inlet of the gas turbine zone as to maintain an improved overall heat rate over a wide load range of operation of the combined power plant.

Still more particularly, the method of the invention involves a system of gas recycling wherein at least a percentage of the gaseous combustion products are withdrawn from gas flow in the steam generating zone after those combustion products have had their temperature reduced by the transmittal of heat therefrom for steam generation. These withdrawn gases are introduced as tempering gases into an unrecirculated gas zone downstream of a pressure firing zone, and upstream of a steam generating zone and a steam superheating zone. The rate of flow of such recycled gases, in combination with the control of the rate of firing of the steam superheating zone and in combination with excess air variation, maintains such conditions of gas temperature and gas flow at the entrance of the gas turbine zone that the overall efficiency of the power plant is maintained at an increased value over a wide load range.

Still more specifically the invention involves a pressure fired boiler unit constituting a steam generating zone from which high pressure steam is delivered to a separately fired superheater and reheater unit for cooperation with the steam generating unit and with an associated steam turbine for superheating and reheating the steam for use in different stages of the steam turbine. The steam generating unit includes a pressure vessel which is separate from the pressure vessel in which the superheater and the reheater unit are housed, each of these units being fired at super-atmospheric pressures by fuel burning means operating at high temperatures. These temperatures are above the fusion temperature of the ash when a slag forming fuel is utilized.

In this combination the invention involves gas recirculation means, preferably withdrawing all of the gases from the steam generating, or boiler unit at a position in the gas flow downstream of the steam generating surfaces, and introducing in controlled percentages a part of the withdrawn gases into a gas zone of the boiler unit at a position upstream of the major part of the steam generating surfaces in a gas flow sense, and downstream from the exit of the fuel burning means in order that the lower temperature recirculated gases may be mixed with the higher temperature unrecirculated gases before any of these gases contact the main steam generating surfaces. The remainder of the lower temperature gases withdrawn from the boiler unit are conducted to the separate superheater-reheater unit at such a position that they may mix with the unrecirculated gases of that unit ahead of the reheating and superheating surfaces of that unit. Preferably the reheater and the superheater within the latter unit are disposed in separate gas passes which are provided with gas flow regulating means to cooperate with the recirculated gas flow, the variation of excess air, and with the firing rate of the superheater-reheater unit to maintain the uniform gas temperature and gas flow at the outlet of the superheater-reheater unit. From this outlet the high pressure combustion gases are conducted, at a temperature of the order of 1400° F. to the inlet of a gas turbine. As the steam demand decreases from, for example, full load to a half load, the recycling of gases as tempering gases to the gas mixing chamber of the superheater unit is decreased and the percentage of excess air is increased (due to the constant loading of the air compressor). The firing rate of the superheater-reheater unit is increased so as to maintain a gas flow at the exit of the super-heater-reheater unit equal to the gas flow at full load at that position. By the coaction of the same variables, and their control, the temperature of the gases at their outlet from the superheater-reheater unit may also be maintained at a substantially constant value in order that the heat rate of the gas turbine may be maintained at a high level, over a wide load range.

The steam generating unit and the superheater-reheater unit may also be associated with a power plant involving an air compressor directly connected to a gas turbine, this compressed air line conducting compressed air at a high temperature, for example, 482° F., to a high temperature air heater receiving gases at approximately 943° F. from the exhaust of the gas turbine. The air is heated to a temperature of the order of 600° F. From the exhaust of this high temperature air heater the high temperature air is delivered to the fuel burning means of the steam generating unit and the superheater-reheater unit, such fuel burning means preferably involving cyclone furnaces burning a particle form slag-forming fuel at temperatures above the fusion temperatures of the ash in the fuel, such temperatures being within the range of 2400° F. to 3200° F.

The invention also involves, in the boiler unit and in the superheater unit, a construction wherein the pressure vessel of either of these units is protected by a circular layer or envelope of low temperature recirculating gases passing in an annular gas pass along the inner surface of the pressure vessel from an outlet of the gas recirculation system to a position of gas mixing in the pertinent units. The inner wall of this annular gas pass is formed by a ring of contacting steam generating tubes, and the arrangement within the pressure vessel is such that any leakage of gases from the convection section must take place inwardly from the zone of recycled gas introduction, on account of the higher pressure of the recycled gases. This arrangement substantially contributes to maintenance of the pressure vessel wall at a predetermined low temperature.

The invention also involves, in the steam generating unit, the use of a multiplicity of different length radially arranged platens, arranged within an annular convection gas pass, and the inter-connection of these platens may be such that the heating of the platens is made more uniform. To this end, for example, a platen at one position in the circular arrangement of the platens may be connected in series to another platen in a diametrically opposite position.

The superheater-reheater unit also preferably involves a multiplicity of different length radially arranged platens of tubes in its convection gas passes. These gas passes are arranged in parallel, with some of the platens constituting a reheater arranged in one of the parallel gas passes and the remaining platens constituting a reheater arranged in the remaining pass.

The tubes of the above indicated platens constitute part of a once-through forced flow steam generating system, including all of the heat absorbing tubes of the steam generating unit, and the superheater-reheater unit. Water is pumped into the inlet end of this system at a temperature of the order of 500° F., and steam exits at the outlet end of the system at a pressure of the order of 1800 p.s.i., and at a temperature of the order of 1000° F. Steam, at this pressure, exits from the superheater and, preferably, from the reheater, both of which preferably include an arrangement of radially arranged platens of tubes, similar to the arrangement of platens in the steam generating unit.

The invention will be described with reference to the accompanying drawings which illustrate a preferred embodiment of the invention.

In the drawings:

Figs. 1A and 1B are fragmentary supplementary views in the nature of side sectional elevations, indicating the structure of the boiler unit B and the superheater unit S of the steam generating and superheating system, and the arrangement of the heat absorbing components within the pressure vessels of those units;

Fig. 3 is a plan section on the line 3—3 of Fig. 1A;

Fig. 4 is a multiple level horizontal sectional view showing the arrangement of the successively shorter radial platens of the B unit, the different quadrants W, X, Y and Z being taken respectively upon the section lines 4W—4W, 4X—4X, 4Y—4Y and 4Z—4Z, of Figs. 1A and 1B;

The binary elastic fluid power plant of the drawings includes a high pressure steam generating and superheating system having separate steam generating and steam superheating units in separate pressure vessels, and separately fired by cyclone furnaces at a combustion gas pressure at least as great as a plurality of atmospheres. The steam generating and superheating system simultaneously delivers high temperature and high pressure steam to a steam turbine and high pressure (i.e. 80 p.s.i.) and high temperature combustion gases to a gas turbine.

The two separately fired units of the steam generating and superheating system are connected in series as to gas flow, and the first unit, including its housing pressure vessel, is predominantly a steam generating unit and is herein designated as the B unit. The high pressure combustion gases from that unit flow to the similar S unit, so designated because it is predominantly a steam superheating and reheating unit. From the S unit, high pressure heating gases flow directly to the inlet of the gas turbine (354, Fig. 2) at substantially constant pressure, temperature and weight rate of flow, over a wide range of power plant output. High pressure steam flows from the outlet of the superheater of the S unit to the steam turbine inlet, this flow of steam being controlled in accordance with variable steam or power demand.

With the above indicated operation, the overall improved heat rate of the combined power plant at full load is maintained throughout a wide load range, thus compensating for the usual characteristic falling off of steam generator exit gas temperature with load, which, without some compensating provision, would cause the improved heat rate of the combined power plant, at full load, to disappear at half load.

In the preferred embodiment of the invention, a steam generating and superheating system constantly delivers combustion gases to the inlet of the gas turbine, of a temperature of the order of 1450° F., and of a pressure of the order of 80 p.s.i.

Figure 1B:
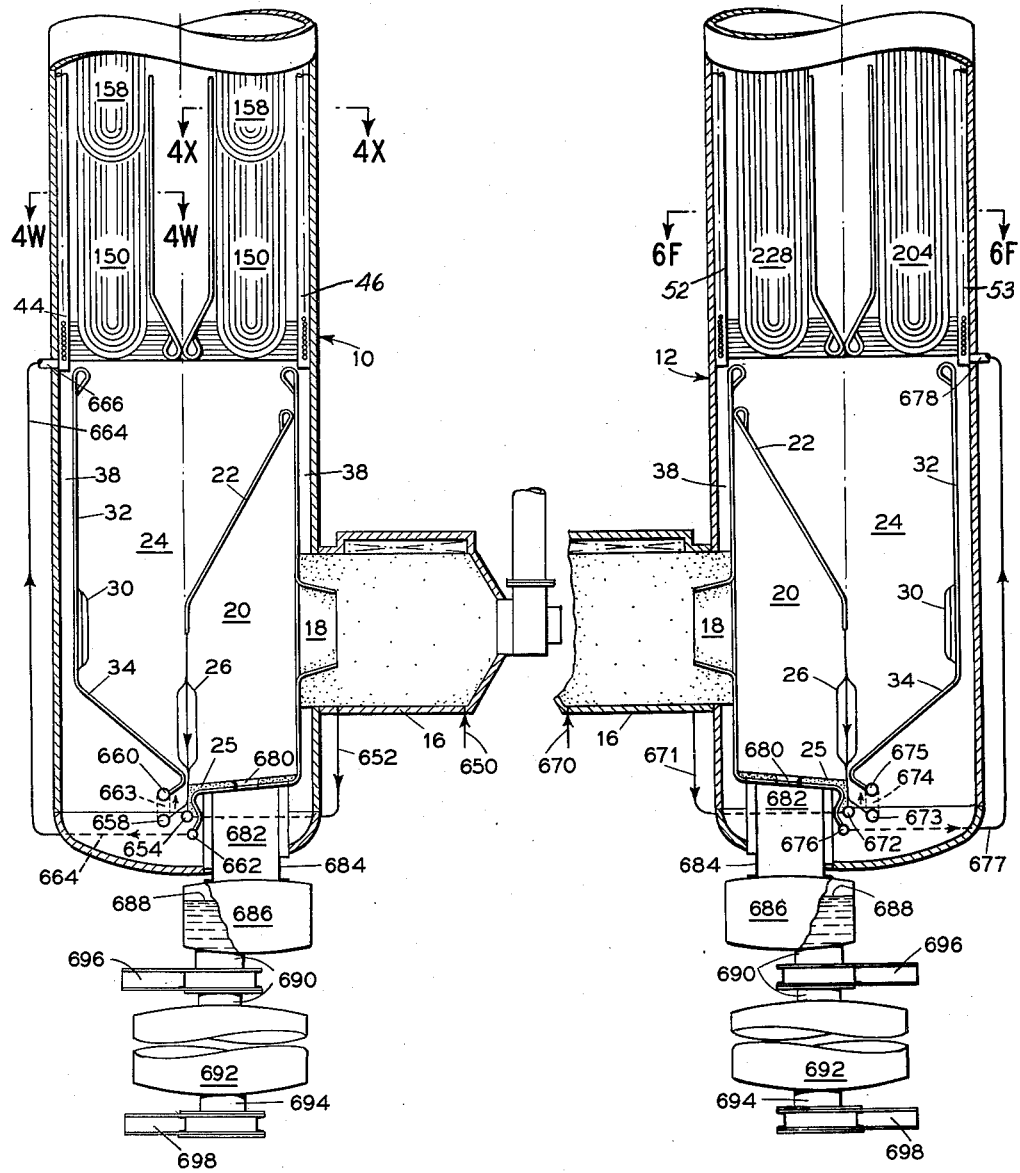

Therefore the B and S units of the steam system are housed within pressure vessels which are indicated at 10 and 12 in Figs. 1A and 1B. These pressure vessels are of a diameter of the order of 12 feet and they are, preferably, in the form of upright hollow cylinders of heights from 80 to 110 feet. They house all of the heat absorbing surfaces of the forced flow, once-through steam generating and superheating system designed to provide over 600,000 pounds of steam per hour at a temperature of the order of 1000° F., and at a pressure of the order of 1800 p.s.i. Each of the main steam system units, B and S, is fired at its lower part by a coal burning cyclone, the boundary surfaces of which include water heating or steam generating tubes, the structure and arrangement of the cyclones being of the type generally indicated in the patent to Kerr et al. 2,594,312 of April 29, 1952. Each of the main units of the steam generating and superheating system has a cyclone furnace 16 discharging combustion gases through its throat 18 into a primary furnace chamber 20. The walls and other boundary surfaces of each primary furnace chamber are defined by closely arranged fluid conducting, steam generating tubes, with the division wall 22 dividing the primary furnace chamber from the gas mixing chamber 24, having their lower portions widely spaced to form the tubular screen 26, providing gas flow openings through which the combustion gases may flow from the primary furnace chamber 20 into the gas mixing chamber 24. In this chamber the combustion gases from the cyclone, at temperatures within the range of 3200° F. to 2400° F., are mixed with lower temperature recirculated gases at a temperature of about 850° F. These recirculated gases enter the gas mixing chamber between the widely spaced tubes of a tubular screen 30, formed by parts of the closely arranged steam generating tubes included in the gas mixing chamber wall 32 and its floor 34 opposite the screen 26. The tubes of the wall 32 have their longitudinal axes passing through a circle which is concentric with but inwardly spaced from the wall of the pertinent pressure vessel, thus forming a downflow annular gas pass 38 through which recirculated gases pass to the lower portion of the pressure vessel and thence to and through the screen 30.

In the case of the steam system unit B the lower temperature gases from the recirculated gas fan flow through the gas pass 38 which forms a downward continuation of the annular gas pass which is indicated at 40 in Fig. 4. The inner wall of the gas pass 40 is formed by tangent or touching horizontally disposed steam generating tubes 42, connected to and communicating with diametrically opposite upright headers 44 and 46, which are connected into the water and steam flow circuit of the steam system in a manner to be described later.

Figure 6:
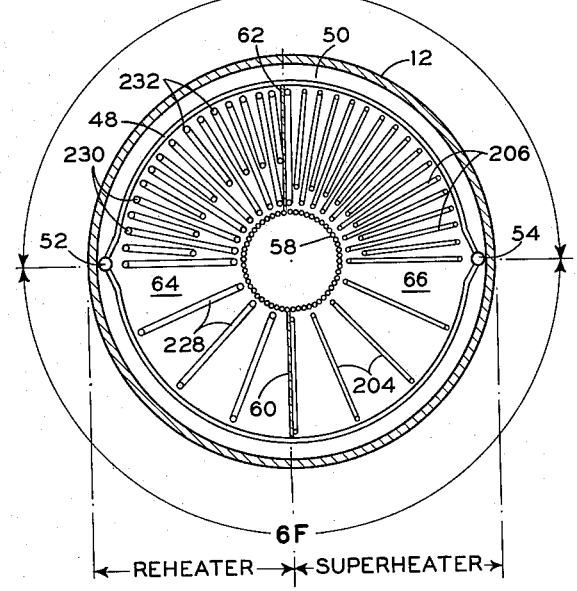
Fig. 6 is a dual level, horizontal transverse section of unit S, the upper part of this figure being taken on the section line 6E—6E of Fig. 1A, and the lower part of the Fig. 6 being taken on the section line 6F—6F of Fig. 1B.

Figs. 6, 1A and 1B indicate a similar arrangement of circular or semi-circular tangent or touching tubes 48 spaced inwardly of the shell of the pressure vessel 12, so as to provide the annular gas pass 50 which is an upward continuation of the gass pass 38 of the S unit. The steam generating tubes 48 are similarly connected into the fluid flow system through a similar arrangement of headers 52 and 53. In the pressure vessels 10 and 12 the headers 44, 46, 52 and 53 may have a plurality of transverse diaphragms to cause the water flow in the connected tubes to have a plurality of recurrent passes.

Referring again to Fig. 4, the steam system unit B may be said to have an outer ring of tubes 42 concentric with and spaced outwardly of a ring of steam superheating tubes constituting the inner core 54, with the annular space between the inner core and the outer ring tubes 42 constituting an annular gas pass 56 in which upright platens of convection heating tubes are arranged, in a manner to be later referred to. Similarly, the unit S has an inner core 58 of tangent steam heating tubes spaced inwardly of the outer ring tubes 48 so as to form, with the upright radial baffles 60 and 62, the parallel semi-annular gas passes 64 and 66. The upright radial platens of the reheater are arranged in the gas pass 64 and similar platens of the superheater are arranged in the gas pass 66 in a manner which will be later described.

All of the gases passing upwardly through the annular convection gas pass of the unit B exit from that gas pass through the gas outlet 65 and thence through an appropriate duct 67 to the inlet 68 of a recirculated gas fan, having an outlet duct 70 divided at 72 to form separate passages 74 and 76, dampered as indicated at 78 and 80, respectively, for gas flow control purposes.

The gas flow passage 76 communicates with the top of the annular gas pass 50 of the S unit for flow of the recirculated gases downwardly to the gas mixing chamber 24 of that unit. Similarly, the passage 74 communicates at 82 with the top of the annular gas pass 40 of the B unit for flow of recirculated gases downwardly through that annular gas pass, then through the connecting annular gas pass 38, and thence through the screen 30 into the gas mixing chamber 24.

Within each gas mixing chamber the recirculated gases at a temperature of the order of 850° F. are mixed with the gases issuing from the pertinent cyclone furnace at temperatures within the range of 2400° F. to 3200° F. in such proportion that the mixed gases enter the pertinent annular convection gas pass at a temperature of the order of 2200° F.

With the above indicated arrangement, resulting in a downward flow of the recirculated gases in the annular space formed by the outside cooling tubes and the shell of each pressure vessel, the metal of the shell is always maintained at a temperature of the order of 850° F., thus minimizing or eliminating damage to metal of the shell from thermally created stresses. This arrangement, also, on account of the slightly higher pressure of the recirculated gases, results in a situation whereby any gas leakage through the circular wall formed by the tubes 42 or the tubes 48, would take place from that annular passage to the inside of the setting.

Figure 2:
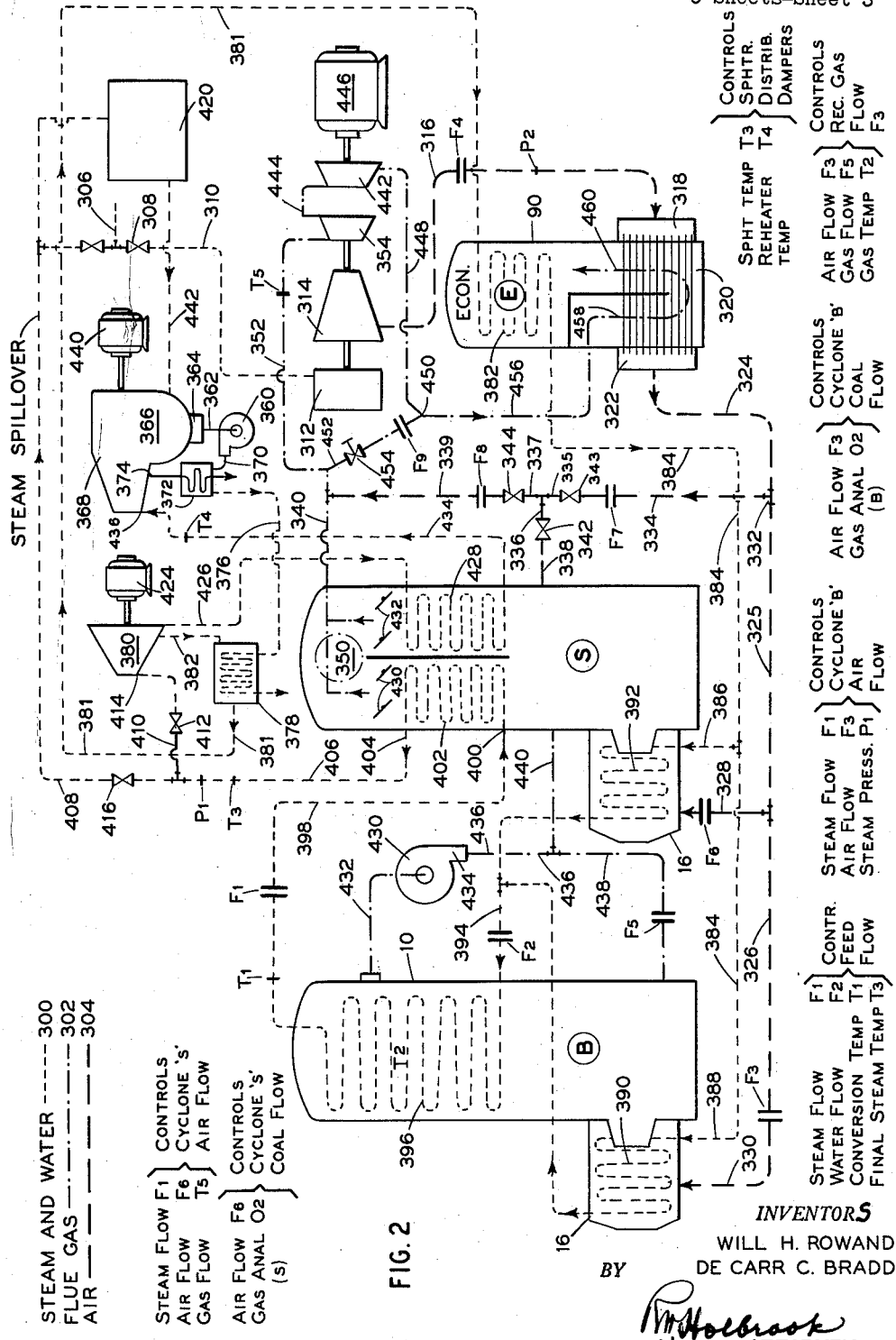
Fig. 2 is a diagrammatic figure illustrating the arrangements of the different components of the power plant, and some of their connections.
Figure 5:
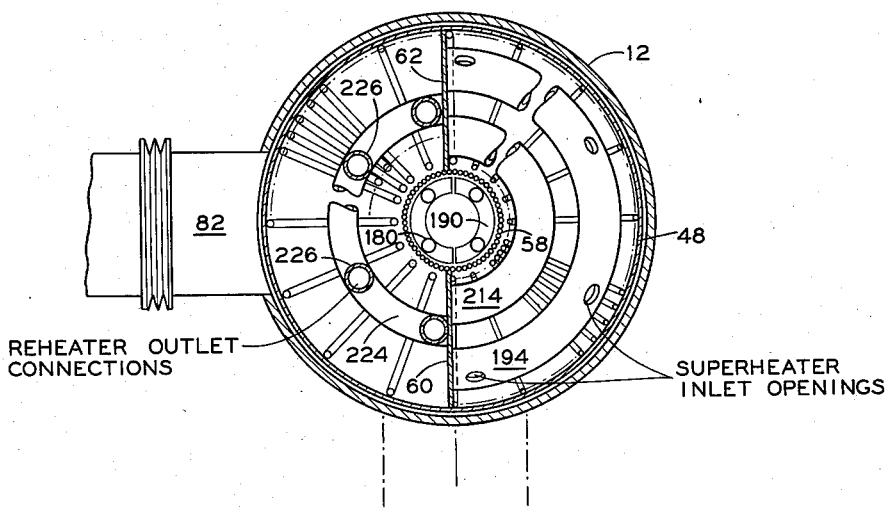
Fig. 5 is a view in the nature of a plan section on the line 5—5 of Fig. 1A.

Preferably, about 54% of the total fuel fired in the steam system is fired in the cyclone of the B unit, and the recirculated gas system returns 54% of the gases to the mixing chamber of the B unit. The remaining 46% of the gases issuing from the recirculated gas fan pass to the S unit where they protect the shell of the pressure vessel of that unit in passing downwardly through the annular gas passes 50 and 38, and then mix with the higher temperature gases from the 46% of the fuel fired in the cyclone furnace 16 of the S unit. These combined gases then pass upwardly over and between the steam superheater and steam reheater platens disposed within the upright gas passes 64 and 66, the temperature of the gases being reduced in these gas passes from a temperature of the order of 2200° F. to 1450° F. From the outlets of the superheater and reheater gas passes (at dampers 200 and 202, Fig. 1A), the gases pass through the outlet opening 350 of the S unit and through a line 340 (Fig. 2) at approximately a pressure of 78 p.s.i. to the inlet of the gas turbine 354 (Fig. 2).

Figure 8:
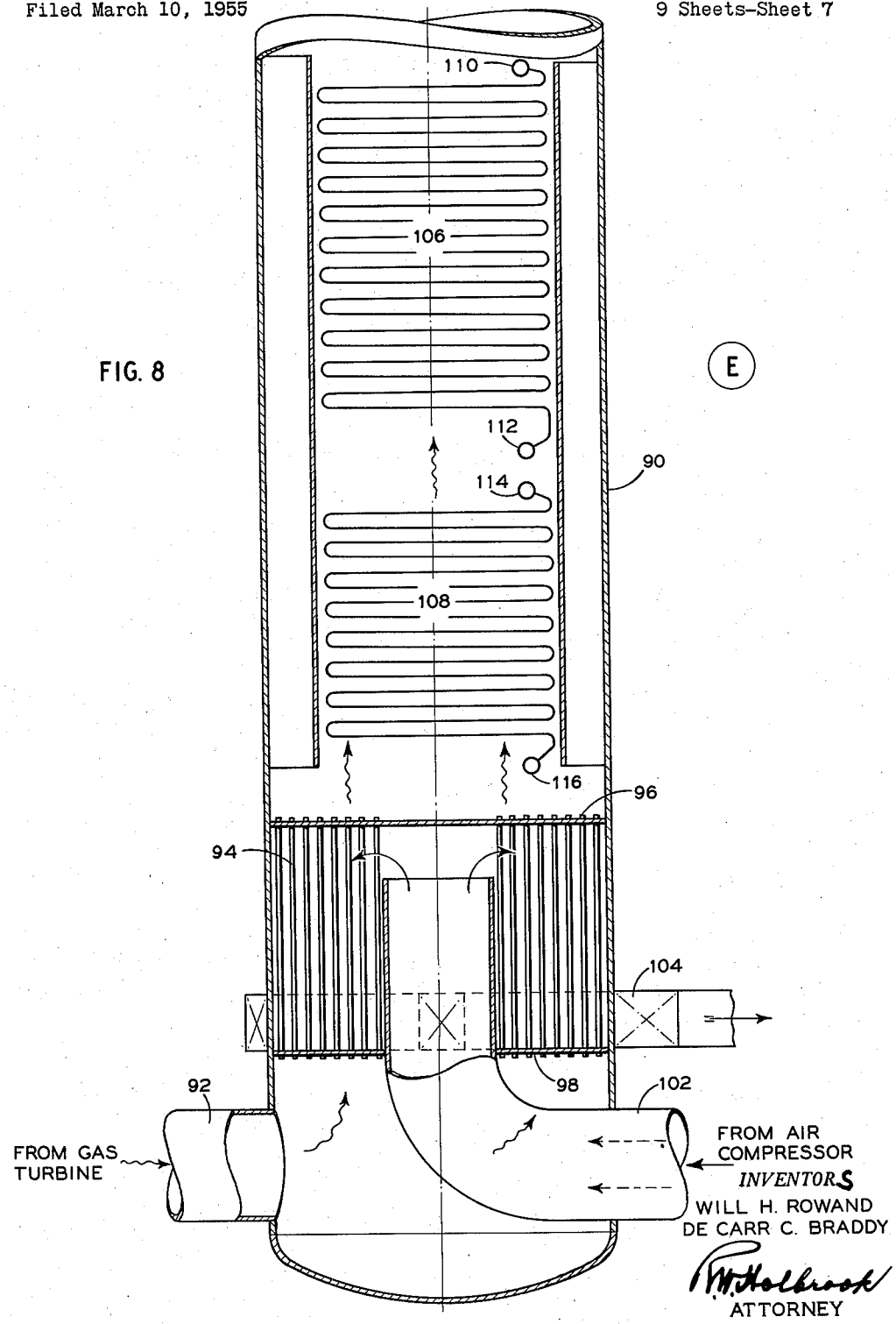
Fig. 8 is a vertical section through one of the pressure vessels housing the air heater and two economizer sections.

The gases exhausting from the gas turbine at a temperature of the order of 943° F. are divided (equally) into two flow paths, and the gases from each of these flow paths pass into the lower part of an E unit which may be otherwise referred to as a combined economizer and air heater unit. There is preferably an E unit for each gas flow path. Such a unit is indicated in Fig. 8 wherein the exhaust gases from the gas turbine pass into the pressure vessel 90 through the inlet duct 92. The gases then pass upwardly through a large number of upright air heater tubes 94 spaced apart and fixed at their ends in the upper and lower tube sheets 96 and 98.

Air flow from the air compressor 314, directly connected to the gas turbine 354 (Fig. 2) is preferably equally divided into two streams, passing into separate units E through the inlets 102, which continue up into the air heaters as indicated in Fig. 8. From the outlet of this conduit, in each E unit, the air passes to the spaces around and between the air heater tubes 94, and exits through the conduit 104, at a temperature of the order of 600° F. to one of the cyclone furnaces. The conduits 104 preferably join to form the line 324 (Fig. 2).

Above the air heater, in each unit E, are arranged two convection economizer sections 106 and 108, each section consisting of a multiplicity of spaced tubes through which feedwater flows. Feedwater enters the inlet header 110 (Fig. 8) of the economizer section 106, at a temperature of the order of 220° F., and flows to the outlet header 112 at a temperature of the order of 335° F. Thence, the feedwater flows to an intermediate inter-stage feedwater heater. There may be a plurality of such inter-stage feedwater heaters (see 372 and 378, Fig. 2) through which the feedwater flows in series to enter the inlet header 114 of the economizer section 108 at a temperature of the order of 450° F. From the outlet header 116 of the economizer section 108, the feedwater flows to the inlets (650 and 670, Fig. 1B) of the initial parts of the once-through forced flow fluid system of the steam generator and superheater system. The wall tubes of the cyclone furnaces constitute such initial parts of this system.

Figure 7:
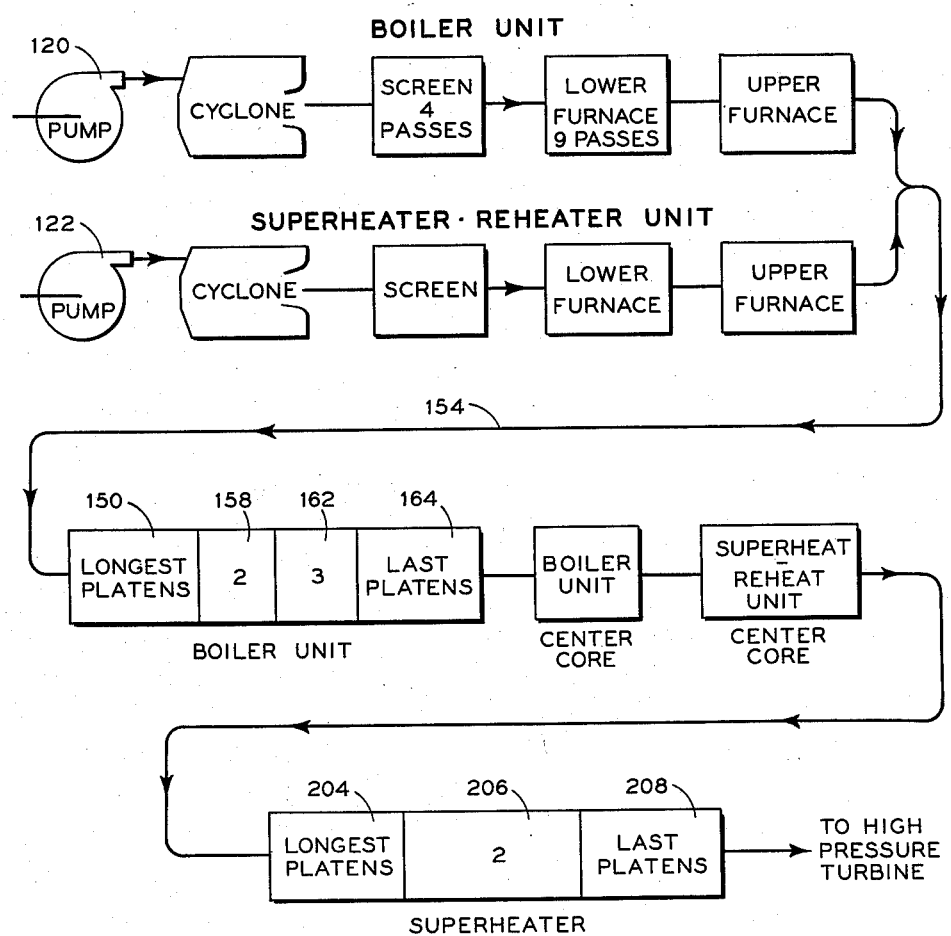
Fig. 7 is a flow diagram showing the flow of water or water and steam, from the feedwater source of the forced flow once-through steam generating system to the outlet of the superheater and the inlet of the high pressure turbine.

The flow of feedwater and steam through the once-through forced flow system of the steam generator and superheater system is intended to be indicated by the diagrammatic disclosure of Fig. 7. The total flow of feedwater, of the order of 670,000 pounds per hour, for example, is divided equally between the pumps 120 and 122, with the former initiating the movement of fluid through the B unit (or boiler unit), and the pump 122 initiating the fluid flow through the superheater-reheater unit (or S unit). In each unit, the feedwater flows from the pump to and through the tubes within the walls and other boundary surfaces of the cyclone furnace. From that tubular system the feedwater flows, preferably in four recurrent passes through the tubes of the division wall or screen wall 22, and its screen 26. From these screen tubes fluid passes into and through nine recurrent passes formed by the wall tubes of the wall 32, the floor 34 of the gas mixing chamber, and the wall tube sections along the floor 25 of the primary furnace chamber 20. All of these wall tubes or wall tube sections may be considered as constituting the heat absorbing surfaces of what may be termed the lower furnace, extending to approximately the level of the lower ends of the longest heat absorbing platens of the convection gas passes.

From the tubular system of the lower furnace, in each of the main fluid flow system unit B and S, the flow continues to and through the circuits of the outside wall of the convection pass, (or the upper furnace section), these circuits being primarily formed, in the B unit, by such tubes as those indicated at 42, by such headers as those indicated at 44 and 46 in Fig. 4, and in the S unit, by such tubes as those indicated at 48, and such headers as those indicated at 52 and 53. Water enters this section at the bottom and flows up through multiple horizontal and recurrent passes formed by diaphragms within the headers. These diaphragms are, preferably, closer together toward the bottom of the unit in order to maintain an optimum of 21 feet per second water velocity as the gases are reduced in temperature. Alternatively, successive separate, and series connected, headers such as the headers 4 and 46, or 52 and 53, may be increased in length from the bottom of the convection section toward its top in order that the number of tubes in parallel in each pass shall be increased as the temperature decreases. This does not necessarily decrease the velocity of the fluid flow because the specific volume of the fluid inside the tubes is increasing.

The fluid flow system described in the immediately preceding paragraph is referred to in the flow diagram of Fig. 7 as the upper furnace. At the outlet (232 and 234, Fig. 1A) of the fluid system of the upper furnace of the boiler unit (or B unit), there is 16% of steam by weight, and at the corresponding outlet (238, Fig. 1A) of the upper furnace system of the superheater unit (or S unit) there is 11% of steam by weight. At this point the fluid flows from the two main units are combined and mixed, with the result that there is, in the combined flow, 13.3% of steam by weight entering the longest platens of the B unit. Such platens are indicated at 150 in Figs. 1B, 4 and 9; each consists of a plurality of radially aligned and nested U-tubes having their inlet legs connected to and communicating with the torus header 152, at the upper part of the B unit. This header receives the preceding combined fluid flows through the line 154 of the Fig. 7 diagram. The up-flow legs of the tubes of these platens communicate with and are connected to, the inner torus header 156. Leading downwardly from the header 156 are the inlet legs of the next shorter platens 158. Each of these platens similarly consist of nested and radially aligned U-tubes and the platens 158 are interspersed with reference to the platens 150, as indicated in Fig. 4. The flow of fluid upwardly through the outlet legs of these platens 158 continues into the next outside torus header 160.

There are eighteen of the platens 150 and a similar number of the platens 158, each platen consisting of thirteen 1" O.D. tubes in parallel, thus making 468 tubes in parallel in these two series of platen sections 150 and 158. At the next platen level, or in the zones of the platens 162 (Fig. 1A) there are an additional thirty-six platens. Therefore, the original steam and water mass flow is maintained by splitting this group (162) into two sections of eighteen platens, and arranging them in series, one half of these platens conducting fluid to the header 170, and the remainder conducting fluid from header 170 to header 172 (see Fig. 9). At the top of the unit, and in the zone of the shortest platens 164, there are an additional seventy-two platens. Thus the flow in this section where the gas temperature has been reduced to half of that in the previous circuits has been reduced. Therefore, there are thirty-six platens in parallel in this section. As indicated in Fig. 9, thirty-six of the platens 164 conduct fluid from the header 172 to the header 174, and the remaining thirty-six platens 164 conduct fluid from the header 174 to the outlet header 176.

Figure 9:
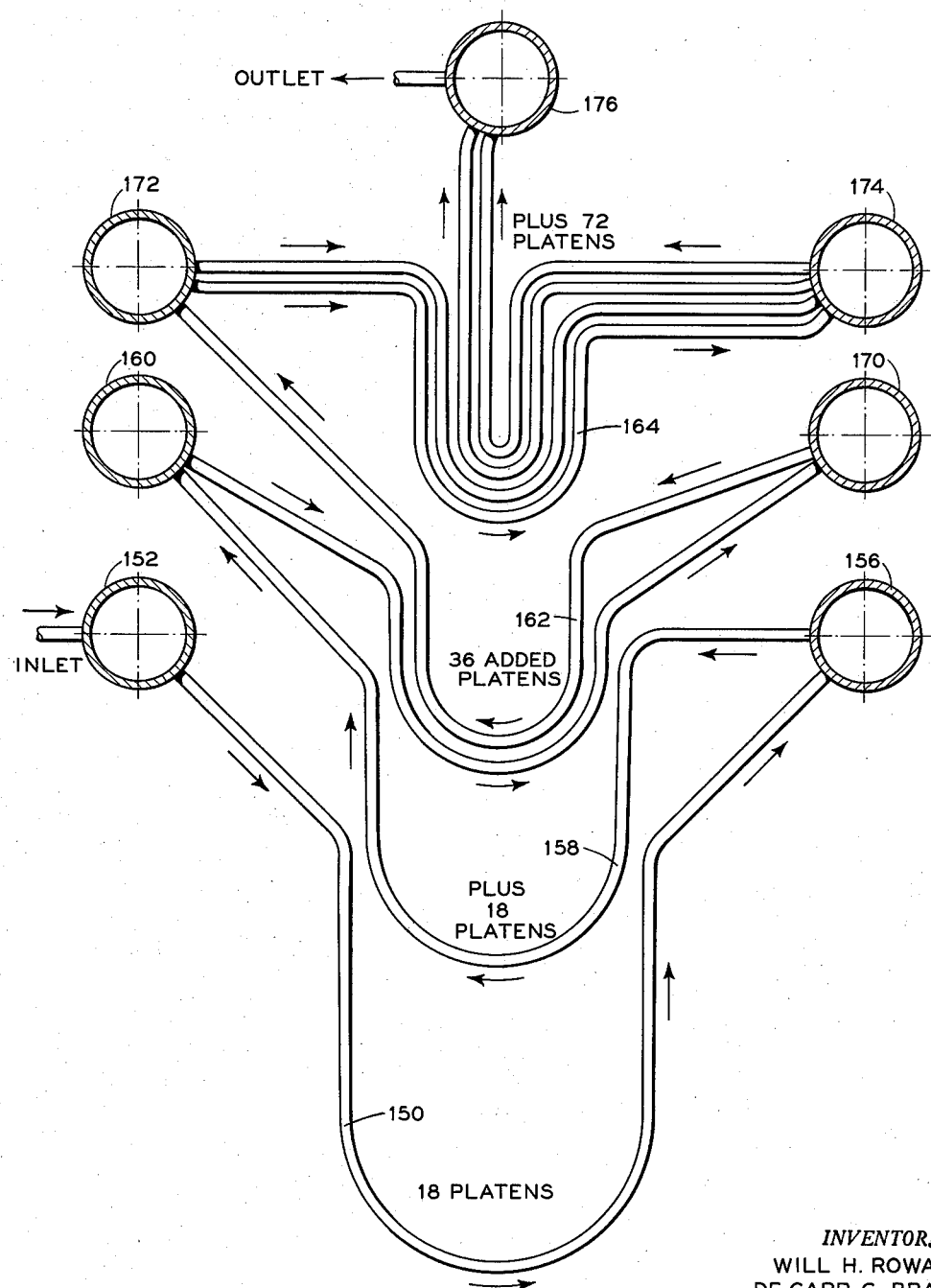
Fig. 9 is a diagrammatic view clarifying the arrangement of the different sets of pendent tube platens of the B unit, and their relations to their connected headers.

Fig. 9 is a diagrammatic view intended to clarify the arrangement of the pendent and radially arranged platens of the B unit, with particular reference to the connections of the platen tubes with their headers, and with reference to the increasing numbers of platens in the successively shorter groups 150, 158, 162 and 164. Fig. 9 is intended to indicate that the number of platens in the groups 150 and 158 is the same, but that the number of platens in the next upward group 162 is twice the number in either one of the groups 150 and 158. It is also intended to indicate that the groups of platens 164 in the uppermost group is twice the number in the group of next longer platens 162.

The water and steam mixture becomes 100% steam in the third group of platen tubes 162. Therefore, the shortest platens 164 constitute superheater surface. The steam leaves these shortest platens at a temperature of the order of 815° F., flows through the serially connected tubes of the inner core 54 of the B unit, as indicated in the diagram of Fig. 7, and then flows, by appropriate connections, through the serially connected tubes of the inner core 58 of the S unit.

Fig. 1A indicates the connections whereby the steam flows from header 176 to the inner core tubes of the B unit, and then to the inner core tubes 58 of the S unit. These connections include the inlet tube 182 of the B unit, leading from the header 176 to the semi-circular header 184. From this header the steam flows recurrently upwardly and downwardly through a plurality of passes in the inner core tubes 54, and exits to the header 186, from which an outlet tube 188 is connected, by the line 250, to the inlet tube 180 of the S unit. This inlet tube leads to the semi-circular inlet header 178 for the superheating tubes of the inner core 58 of the S unit. From the core tubes 58 the steam flows to the semi-circular outlet header 190, and then through the outlet conduit 192 to the semi-circular header 194 (the superheater inlet header) for the longest platens of the convection superheating surface of the S unit.

The superheater (or S) unit is divided into superheater and reheater sections by the upright division walls 60 and 62 (Fig. 6), with the superheater preferably occupying about 53% of the plan area. Gas flow through the superheater gas pass 66 and the reheater gas pass 64 is regulated for the purpose of controlling superheat and reheat temperatures by appropriate control of the dampers 200 and 202, which are indicated in Fig. 1A as disposed at the outlets of the reheater gas pass 64 and the superheater gas pass 66.

The flow through the convection section of the S unit is similar to that of the B unit. The initial flow is through the longest U-bend tubular platens 204 (Fig. 1B). There are nine of these platens, each consisting of thirteen 1½" O.D. tubes arranged as nested U-tubes in radial alignment. From the longest superheater platens 204, the steam flow continues through appropriate header connections to the next and shorter group of platens 206. There are the same number of platens 206 as 204, with the same number of tubes in parallel in the platens 206 as in the platens 204.

From the outlet of the platens 206 the steam flows through appropriate header connections to the inlet legs of the shortest superheater platens 208. There are eighteen of the shortest superheater platens 208.

The outlet legs of the shortest superheater platens 208 are connected to the superheater outlet header 210, from which steam flows through appropriate connections to the inlet of the high pressure steam turbine. The intermediate superheater headers, affording communication between the successive groups of superheater platens, are indicated at 212 and 214. Like the superheater, the reheater has three sets of radially arranged pendent platens of nested U-tubes. They are indicated at 228, 230 and 232 in Figs. 1A and 6. They are appropriately connected to the reheater headers 220, 222 and 224 so that the steam flows from the reheater inlet header 220 through the longest reheater platens 228, then through the tubes of the intermediate reheater platens 230, and then through the tubes of the shortest reheater platens 232 to the reheater outlet header 224, the reheater outlet connections leading from the header 224 to the inlet of the low pressure steam turbine being indicated at 226.

By way of clarifying and coordinating the disclosure of the flow diagram of Fig. 7, and the disclosure of Fig. 1A with respect to the water, or water and steam flow connections from the flow circuits of the upper furnaces of the B unit and the S unit, to the longest platens of the B unit, attention is invited to the upper left hand part of Fig. 1A wherein the uppermost header section 44A is intended to illustrate the outlet header section for the flow circuits of the upper furnace of the B unit. From this header section, the steam and water mixture flows through the outlets 232 and 234, to the inlet header 152 of the convection heating platen sections of the B unit. This header 152 also receives, through the inlet connection 154 and the line, or conduit 236, the outlet flow from the outlet connection 238 for the uppermost header section 240, which is aligned with, or is a part of the header 53 of the S unit (see Fig. 6). The steam and water mixture from the outlet connection 238 of the circulatory components of the upper furnace of the S unit flows through the line 242 to the branch line 236, and thence to the inlet connection 154 of the header 152. The header 152 is indicated in Fig. 1A as also having another inlet connection 244 diametrically opposite the connection 154. This inlet connection 244 is also connected as a branch line to the conduit 242 to receive the mixture flow from the outlet connection 238 of the S unit.

With further reference to Fig. 1A, the outlet connection 188 leading from the outlet semi-circular header 186 of the B unit is connected by the conduit 250, with the inlet connection 180 leading to the semi-circular inlet header 178 for the core tubes of the S unit.

Fig. 2 is a diagram illustrating the general relationship of the main components of the composite binary elastic fluid power plant, with the water flow, and the steam and water flow indicated by the type of dash line 300. The flow of heating gases is indicated by the dash-and-dot line 302, and the flow of air is indicated by the long dash line 304.

The steam generating, or B unit, with its cyclone furnace 16 is clearly indicated at the left hand part of Fig. 2, and the steam heating unit S with its similar cyclone furnace is clearly indicated in the middle part of this figure. One of two duplicate economizer units is indicated at E, with its containing pressure vesssel 90.

To start the Fig. 2 power plant, steam under pressure may be admitted through the line 306, the valve 308 and the connected line 310 to the steam turbine 312, which constitutes an auxiliary driving means directly connected to the air compressor 314. A separate source of steam may be thus employed. The air outlet of this compressor communicates by the line 316, with the air inlet 318 of the air heater 320. The air outlet of the air heater is indicated at 322, and it is directly connected by the line components 324—326 to the branches 328 and 330 which lead, respectively, to the cyclone furnace of the unit S and the cyclone furnace of the unit B. The compressed air outlet line, including the components 324—326 is branched at 332, with a by-pass line including the components 334—340 leading from the branched connection at 332. This by-pass line is also valved as indicated at 342—344 in order that there may be selective control of the temperature of the gases ahead of the heating gas outlet 350 of the unit S. When the temperature of the heating gases proceeding from the top of the S unit 350 through the line 340 and the line 352 to the inlet of the gas turbine 354 tends to become too high, an automatic control system governed from indications of gas temperature from the point $T_6$ in that line automatically operates, in proper sequence, the valves 342—344 in order that the lower temperature air from the line 334 may be admitted ahead of the superheater and the reheater in order that the temperature of the gases exiting from the S unit may be maintained at a temperature of the order of 1450° F.

Simultaneously with the entry of combustion supporting air through the branch lines 328 and 330 to the cyclones 16, fuel is caused to enter the cyclones through appropriate fuel feeding apparatus, preferably controlled from indications of air flow to the cyclones in the branch lines 328 and 330. Such fuel feeding apparatus must include a plurality of successively operable pressure locks in order that the pressure of the combustion gases within the cyclone furnaces may be maintained at a value of the order of the pressure of the air entering the cyclones from the air compressor 314.

Thus, as described above, combustion is initiated in the cyclones 16 in order that high temperature heating gases, preferably of temperatures within the range of 2400° F. to 3200° F. shall enter the primary furnace chambers at the lower furnace sections of the units B and S, and in order that gases of adequately high temperature may effectively heat the heat absorbing surfaces of the fluid circuits within the B unit and the S unit. The circuits providing these fluid heating surfaces have been described, as to detail, in the preceding part of this specification, and the fluid flow through such circuits is indicated in the diagrammatic Fig. 2 by the line 300. The initial part of this fluid flow may be considered as beginning in the pump 360, which is connected by the inlet line 362 to a hot well, or water chamber 364 at the lower part of the condenser 366 of the low pressure turbine 368. The outlet of the pump 360 is connected by a line 370 to an inter-stage feedwater heater 372 which is heated by steam conducted through tthe bleed 374, from a stage of the turbine 368. Feedwater heated in the heater 372 passes through the line 376 to the feedwater inlet of the next inter-stage feedwater heater 378, heated by steam bled from an inter-stage position of the high pressure turbine 380 through a bleed 382. The feedwater outlet of the inter-stage heater 378 is connected by a line 381 with the feedwater inlet of the convection economizer housed within the pressure vessel 90 of the unit E, the economizer being here indicated by the return bent short dash lines at 382. From the outlet of the economizer, the heated water passes through the line 384 and its branches 386 and 388 to the initial parts of the parallel flow once-through circuits, said initial parts being diagrammatically indicated at 390 and 392 as recurrently disposed circuit constituents within the boundary surfaces of the cyclones 16. Fig. 2 diagrammatically illustrates the water flow from the outlets of the circuits in the surfaces 390 and 392 as combining in the line 394 leading to the steam generating surfaces diagrammatically indicated at 396 within the pressure vessel 10 of the unit B. At this point it should be remembered that Fig. 2 is extremely diagrammatic for the purpose of clearly illustrating generally the layout of the composite power plant, and that therefore the previously described detailed structure of heat absorbing surfaces between the outlets of the cyclone fluid heating circuits and the point where the two parallel water flows join, are here omitted.

At some point in the once-through fluid flow beyond the union of the two water flows in the line 394, the fluid within the once-through line becomes 100% steam. This transition or conversion point may take place within the unit B or at some exterior position in the line, as indicated at $T_1$. From this position the line leads through the steam flow control take-off point $F_1$ and then through the continuation line 398 to the inlet 400 of the superheater, the convection heat absorbing surfaces of which are diagrammatically indicated at 402.

From the steam outlet 404 of the superheater 402, superheated steam flows through the line 406 to and past the point $T_3$, at which the final temperature of the superheated steam is measured and translated into corresponding control representations, by appropriate instrumentality. The line 406 continues past the point $P_1$ at which point an appropriate instrumentality measures the steam pressure and translates it into corresponding control representations by an appropriate instrumentality. Beyond the point $P_1$ the line 406 branches into a steam spill-over line 408, the branch 410 leading through the main turbine valve 412 to the inlet 414 of the high pressure steam turbine 380. Appropriate control system components preferably automatically open the valve 416 when the main turbine valve closes, and when the valve 416 is open, steam spills over through the line 408 leading to the desuperheater 420 where the steam is condensed. Condensate from the desuperheater 420 flows through the line 422 to the condenser 366.

The high pressure steam turbine 380 drives the electric generator 424, and exhaust steam from the turbine 380 passes through the exhaust line 426 to the reheater diagrammatically represented at 428 as disposed within the S unit, and in a gas pass parallel with the gas pass in which the superheater 402 is disposed. For control of gas temperatures in these parallel gas passes, and hence for control of reheat and superheat, dampers 430 are disposed at the outlet of the superheater gas pass and similar dampers 432 are disposed at the gas outlet of the reheater gas pass. From the steam outlet of the reheater 428, the reheated steam passes through the line 434 to the inlet 436 of the low pressure turbine 368, which drives the electric generator 440.

Design steam pressure and temperature are attained only after there has been sufficient heat absorption from the heating gases in the B unit and in the S unit. As has been previously indicated, combustion gases at temperatures within the range of 2400° F. to 3200° F. exit from the cyclones 16 into the lower parts of the B and S units. This initiates heat absorption to the fluid conducting and heat absorbing surfaces in the lower parts of these units, but before the gases contact the convection steam generating and heat absorbing surfaces 396 in the B unit, and the convection superheating and reheating surfaces in the S unit, the temperature of the combustion gases must be reduced to a permissible value, of the order of 2200° F., from the standpoint of safety of the tubes of the convection heating surfaces, and from the standpoint of optimum slagging conditions when coal is burned in the cyclones. For the purpose of so reducing the temperature of the combustion gases right after exit from the cyclone 16 of the unit B, the power plant of Fig. 2 indicates a recirculated gas system, including a recirculating gas fan 430, the inlet of which is connected by a line 432 to the gas flow within the unit B and at a position beyond the convection surface 396, with respect to gas flow. From the outlet 434 of the gas recirculating fan 430, the line 436 has a branch 438 leading to the lower part of the unit B where a percentage of the gases passing through the fan 430 is mixed with the gases exiting from the cyclone 16 of the unit B, in order that the temperature of the gases shall be reduced to 2200° F. before the convection heating surfaces of the unit B are contacted.

The remainder of the gases passing through the line 436 leading from the outlet 434 of the gas recirculating fan 430 pass through the branch line 440 to the upper part of the unit S. These gases then flow downwardly through the outermost annular gas pass of that unit to its lower part wherein the gases at a temperature of the order of 850° F. are mixed with the high temperature gases originating in the cyclone 16 of the S unit, in order that the temperature of the gases passing over the convection surfaces of the superheater 402 and the reheater 428 shall be at a temperature of the order of 2200° F. The gas flow within the unit S, controllably and properly proportioned between the parallel gas passes for the superheater 402 and the reheater 428 exit from the unit S through the gas outlet 350, and then pass through the line components 340 and 352 to the inlet of the gas turbine component 354, at a temperature of the order of 1450° F., and at a pressure of the order of 80 p.s.i.

The illustrative power plant may have the additional gas turbine component 442 with its inlet connected to the gas outlet of the turbine component 354 by the line 444. The gas turbine component 442 is shown directly connected to the electric generator 446. From the gas outlet of the gas turbine component 442, the exhaust gases pass through the line 448 which is preferably connected at the position 450 to the heating gas line leading from the outlet 350 of the S unit to the inlet of the gas turbine component 354. This connection is made by the by-pass line 452, preferably including the automatically controlled valve 454. The valve 454 is preferably opened by appropriate automatic control mechanism when the gas turbine over-speeds, or tends to over-speed, a percentage of the gas flow through the line 340 then flowing through the by-pass line 452 to reduce such over-speeding or eliminate it, in order that the speed of the gas turbine shall be maintained at a substantially constant value.

The exhaust gases from the outlet of the gas turbine unit 442 passing through the line 448, combined with whatever gases may be by-passed through the by-pass line 452 then continue their flows through the line 456 to the units E. Fig. 2 shows such flow of gases continuing downwardly through the gas pass 458 over the tubes of the air heater 320, and then passing upwardly in a series connected gas pass 460 over the remaining parts of the tubes of the air heater, and then continuing upwardly over the convection heating surfaces 382 of the economizer of the unit E. Thence the gases pass to a stack.

In one method of operation of the power plant of Fig. 2, the rate of feedwater flow into the inlets of the once-through circuits of the water and water and steam system is governed mainly by control impulses, which are representations of final steam temperature at the position $T_3$ in the line 406, leading from the outlet of the superheater through the main turbine valve to the high pressure steam turbine. In other words, the rate of feedwater flow is controlled to maintain, in normal operation, a substantially constant final steam temperature at the position $T_3$. In other words, it may be said that variations in final steam temperature constitute the main influence in controlling the rate of feedwater flow. Control changes in rate of flow may be effected by regulation of an appropriate valve in the feedwater line.

Other operative influences may be used to modify the main feedwater control influence, the final steam temperature $T_3$. One such additional influence may be load or the rate of steam flow appropriately measured and translated into control influences at a point in the steam flow line leading from the B unit to the superheater. Such a point is indicated at $F_1$ in Fig. 2. This influence is used as a moderating or anticipating influence to improve the control of feedwater flow. Another modifying influence is the conversion temperature of water to steam at $T_1$, and a fourth influence may be representations of changes in water flow as indicated at $F_2$ in Fig. 2, this influence being used as a stabilizing influence upon the main control from final steam temperature, $T_3$. This main control, for example, provides for an automatic increase in the rate of feedwater flow as the main turbine valve is opened more widely to increase the steam flow to the turbine, such action preferably taking place in response to an increased demand for the generation of electrical power. As an example of the main influence controlling feedwater flow, when the main turbine valve is suddenly opened in response to a demand for increased power production, the final steam temperature might drop slightly, and in that case, this drop in temperature is immediately effective, through other appropriate control factors, upon the control for the rate of feedwater flow, to immediately restore the final steam temperature to its optimum, or predetermined value.

Control of air flow to the cyclone furnace of the B unit is primarily from steam pressure at $P_1$ in the line 406 leading from the steam outlet of the superheater toward the high pressure turbine 380, this control being modified by the representations of steam flow derived at the point $F_1$ and stabilized by representations of air flow at $F_3$ in the line 326 or the line 330 leading to the cyclone of the B unit. The controlled air flow to the cyclone furnace of the B unit is the primary influence controlling the flow of fuel to this furnace, this influence being modified by control representations of gas analysis in the B unit.

Thus, upon the opening of the main turbine throttle in response to an increased steam demand, there would be a slight drop in steam pressure and this change in pressure would be immediately effective to increase the air flow, and therefore the fuel flow, to the cyclone furnace of the B unit, to increase the rate of steam generation until the pressure reached its predetermined or normal value, a value which would then be maintained over the increased rate of steam generation.

Any such increase in the rate of firing of the cyclone furnace 16 of the B unit would tend to increase the gas temperature in the B unit, but any such change in this gas temperature is immediately reactive, in conjunction with the air flow changes at $F_3$ and gas flow changes at $F_5$ upon the rate of recirculated gas flow at $F_5$. Such recirculated gas flow would be immediately increased in order to restore the gas temperature at $T_2$ to its predetermined optimum value.

The control of the gas flow dampers 430 and 432 at the outlets of the reheater and superheater gas passes respectively takes place, in combination with the other pertinent control factors, from control representations of variations in superheat temperature at $T_3$, and variations in reheat temperature at $T_4$, or the difference of such temperatures, in order to maintain the superheat temperature, or final steam temperature, and the reheat temperature, at a predetermined value, or values.

The control of air flow through the by-pass line components 334, 335 and 338 to the S unit takes place from control representations of air flow at the positions $F_3$, $F_6$ and $F_7$. This control is such that when the total air flow indicated at $F_4$ is greater than the combined air flow at $F_3$ and $F_6$, the valve 343 in the line 335, and the valve 342 in the line 358 are automatically opened to admit air to the gas space of the S unit ahead of the convection superheater and reheater surfaces, or the valves 343 and 344 are automatically opened to admit the excess air through the line 339 to the line 340 leading from the upper part of the S unit.

Also, the method of operation of the Fig. 2 power plant preferably involves the regulation of the flow of air through the by-pass lines 337 and 339 from control indications representative of changes in the gas temperature at $T_5$ in the gas line, including the components 352 and 340, leading to the inlet of the gas turbine component 354. This control is so effective, when the gas temperature at $T_5$ increases beyond a predetermined value, that the by-pass line, including the components 334, 335 and 339, and leading from the mid-point in the air line from the air heater to the cyclone furnaces to the gas line leading to the inlet of the gas turbine, are automatically opened to admit the lower temperature air for mixture with the gases in the line leading to the gas turbine in order that the gas temperature may be immediately restored to its predetermined value, of the order of 1450° F.

The mode of operation control of the Fig. 2 composite power plant is also preferably such that any increase in the gas temperature at the gas turbine exhaust would open a valve 454, and permit a percentage of the gas flow from the line 340 to pass through the line 452, and the valve 454 to the line 448 at the position 450, this line leading from the exhaust of the gas turbine component 442.

The pertinent mode of operation or control of the Fig. 2 system is also such that an increase in gas temperature at $T_5$, in the line leading to the gas inlet of the gas turbine is immediately effective to decrease the air flow and the fuel flow to the cyclone 16 of the S unit, the control indications or representations of changes in gas temperature at the point $T_5$ being modified by control representations of steam flow at $F_1$, and control representations of air flow at $F_6$, the latter flow leading from the air line 325 between the air heater and the B unit to the air inlet of the cyclone 16 for the unit S. Appropriate control representations of changes in air flow at $F_6$ act as a control influence in combination with control representations of changes in gas analysis in the unit S ahead of the superheater and reheater, to automatically control the fuel flow to the cyclone 16 of the S unit.

The steam spill-over valve 416 is preferably automatically opened when the main turbine valve 412 closes, in order that there may be sufficient fluid flow through the steam generating and steam heating circuits, for the purposes of safety (with respect to damaging and abnormal temperature gradients within the system). When the valve 416 opens, the spill-over steam flows through the line 408 to the desuperheater 420. Such action may be effected by appropriate control representations of variation in final steam temperature at $T_3$ to automatically open the valve 416 in the spill-over steam line. Thus, when the flow of steam through the main turbine valve 412 decreases, there would be a tendency for the steam temperature $T_3$ to increase, and any such increase is compensated by the increase of steam flow past the point $T_3$, resulting from the opening of the steam spill-oved valve.

The control of the operation of the Fig. 2 power plant may also involve control components effective to immediately decrease or stop the flow of fuel to the cyclones for the B unit and for the S unit, when the feedwater flow decreases beyond a predetermined minimum value.

Figure 10:
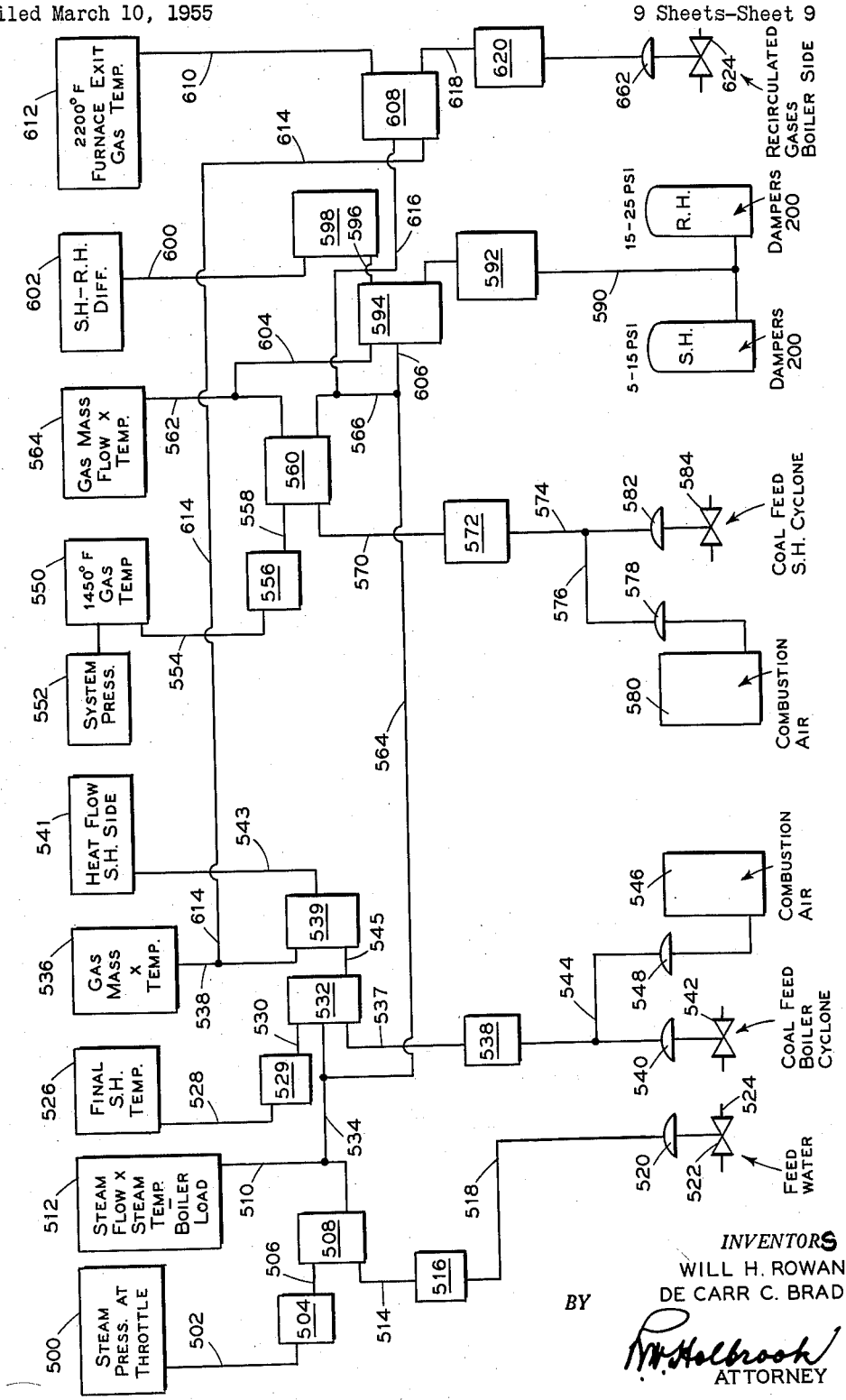
Fig. 10 is a diagram representing a modified method of operating the pertinent binary fluid power plant.

A modified method of controlling the operation of the Fig. 2 power plant is diagrammatically indicated in Fig. 10. In this case the rate of feedwater flow into the once-through forced flow steam generating and superheating system is controlled primarily from indications of steam pressure, so as to maintain a substantially constant steam pressure in the system. To this end a known instrumentality 500 is utilized, for constantly measuring steam pressure at a point in the steam system adjacent the main turbine throttle. This instrumentaliy also translates the variations of that steam pressure from a predetermined value, into representative pneumatic control impulses in a line 502. These impulses are the control influences transmitted to the standardizing relay 504, which may be of the type indicated by the patent to Gorrie, Re. 21,804. These incoming control impulses, desirably modified by the relay 504, result in outgoing impulses through the line 506 leading to the averaging relay 508, which may be of the type shown by the patent to Dickey 2,098,913. This averaging relay receives through the line 510, other incoming control impulses which are representative of changes in the rate of steam generation, or load. The impulses transmitted by the line 510 are generated in the known instrumentality 512. Thus, the outgoing control impulses from the averaging relay 508 may be mainly caused from variations in steam pressure, these outgoing impulses being subject to modification by the anticipating influence of the impulses from the boiler load index as measured by the instrumentality 512. The outgoing impulses from the relay 508 pass through the line 514, through the manual-automatic selector valve 516 and then through the line component 518 to a known valve operator or servo-meter 520 operatively connected to operate the valve 522 in the main feedwater line 524 supplying feedwater to the forced flow once-through steam generating and superheating system.

In the control method of Fig. 10 the rate of firing the cyclone furnace of the B unit is controlled primarily from the final temperature of the superheated steam, this control influence being modified in an anticipating manner by control impulses from the boiler load measuring instrumentality 512, and also modified by changes in the product of gas mass times gas temperature of the unit B. To implement this control, the known instrumentality 526 may be utilized. It acts as a recorder controller measuring changes in the final temperature of the superheated steam, and translates those changes into correspondingly changed control impulses in the outgoing line 528 leading from the instrumentality 526 to the standardizing relay 529. The control impulses translated through the line 528, selectively or adjustably modified by the relay 529 then pass through the line 530 to the selector relay 532, which may be of the type indicated in the U.S. patent to Hartman 2,556,081. This relay, 532, is also subject to incoming influences through the line 534 which is connected to the line 510. These influences through the line 534 are therefore the control impulses, which are representations of changes in boiler load, or steam flow. The selector relay 532 is also subject to another control impulse, or impulses, from the known instrumentality 536 which measures the product of gas mass times gas temperature in the B unit, and translates changes in this product into representative control impulses which are transmitted through the line 538, the relay 539 and the line 545, to the averaging relay 532. Heat flow, on the superheat side, may be measured by the instrumentality 541 and translated into representative control impulses which pass through the line 543 to the incoming side of relay 539. The outgoing impulses from the averaging relay 532 are transmitted through the line 537 and its interposed manual-automatic selector valve 538, to an automatically operated valve operator 540 for the valve 542 which control the flow of fuel to the cyclone furnace of the B unit. A branch line 544 communicating with the line 537 simultaneously and similarly controls the flow of combustion air to the cyclone of the B unit through the mechanism 546, and its servo-motor, or operator 548.

The rate of firing of the cyclone furnace for the S unit is controlled primarily from gas temperature adjacent the inlet of the gas turbine. This control is initially effected by devices including an instrumentality 550, which may act as a gas temperature recorder controller, co-acting with the gas pressure measuring device 552 and translating changes in the gas temperature into representative control impulses which are transmitted through the line 554 as incoming control impulses to the standardizing relay 556. The output impulses from the relay 556 are transmitted through the line 558 to the averaging relay 560. This relay also has other incoming control impulses transmitted thereto. Means for this purpose include the line 562, which leads from the instrumentality 564 measuring the product of gas mass flow and gas temperature in the S unit, and translating changes in such product control impulses for transmission through the line 562. The averaging relay 560 is also subject to the anticipating influence of the control impulses orginating with the instrumentality 512, and transmitted through the lines or parts of the lines 510 and 534, and then through the line 564 and its branch line 566 to the averaging relay 560. The output impulses from the relay 560 pass through the line 570, the manual-automatic selector valve 572, the line 574 and the branch line 576 to the servo-motor or operator 578 of the device 580 for controlling or regulating the flow of combustion air to the cyclone furnace of the unit S. Simultaneously, the line 574 transmits its control impulses to the servo-motor 582 which operates the valve 584 controlling or regulating the supply of fuel fed to the cyclone furnace of the S unit.

The superheater dampers 200 and the reheater dampers 202 are operated in proper sequence by appropriate mechanisms subject to regulation by control impulses passing thereto through the line 590 and its interposed manual-automatic selector valve 592, as output control influences from the selector relay 594. This relay receives, through the line 596, control impulses from the averaging relay 598 which, in turn, receives its incoming control impulses through the line 600 from the known instrumentality 602 which constantly measures the difference in temperature of the steam at the outlet of the reheater and at the outlet of the superheater and translates changes in that difference into representative control impulses to be transmitted through the line 600.

The averaging relay 594 also receives the control impulses of the line 562 through the connecting line 604. This relay is also subject to the incoming control impulses originating in the instrumentality 512, and translated therefrom through the lines 510, 534 and 564, and a continuation line 606. The proper sequential operation of the dampers 200 and 202 for the superheater and the reheater, respectively, is thus effected so as to maintain a substantial equality of, or predetermined difference between, the final superheat and final reheat temperatures, this control being subject to the anticipating influence of control impulses representative of changes in boiler load, and subject to the modifying control impulses representative of changes in the product of gas mass flow and gas temperature in the S unit.

The selector relay 608 is a part of the control components for so regulating the flow of recirculated gases to the gas mixing chamber at the bottom of the B unit that the gases just ahead of the convection section for that unit are maintained at a temperature of the order of 2200° F. This selector relay receives control impulses through the line 610, these impulses being representative of changes in the temperature of the furnace gases at a position just ahead of the convection section of the B unit. This instrumentality 612 may be termed a furnace gas temperature recorder controller. It constantly measures the furnace gas temperature at the indicated position and transmits any variations thereof from a predetermined, or optimum, temperature, in the form of corresponding control impulses in the line 610.

The selector relay 608 also receives, through the line 614, control impulses representative of the changes in the product of gas mass times gas temperature of the B unit, the line 614 communicating with the line 538 for this purpose. Anticipating control impulses representative of changes in boiler load are also transmitted to the selector relay 608 through its incoming line 616, which communicates with the lines 564, 534 and 510, as indicated in Fig. 10.

The outgoing control impulses from the selector relay 608 are transmitted through the line 618 and its selector station 620 to the operator 622 of the valve or damper 624 which controls the recirculated gas flow to the B unit. This damper 624 corresponds to that indicated at 78 in Fig. 1A.

With further reference to Fig. 1B and relating to the initial part of the water flow through the B unit, the arrow 650 is intended to indicate the point at which the water conducting tubes enter the tubular system within the walls of the cyclone furnace for the B unit. These tubes are connected to form a once-through circuit through the walls of the cyclone. The flow from the outlet of this circuit is through the line 652 to the header 654 at the base of the tubes of the screen 26 and the wall 22.

The tubes of this screen, having their inlets connected to the header 654 form a plurality of recurrent or up and down passes, the outlets of which are indicated as being directly connected to the header 658. This header is directly connected to the superimposed header 660 by the conduit 663. From this header 660 the flow continues through the tubes of the screen 30 and the walls 34 and 32, recurrently up and down in a plurality of passes around the lower part of the B unit, with their outlets travering the floor 25 and then being connected to the header 662. Parts of these tubes are arranged within the walls of the throat 18 of the cyclone furnace. From the header 662 the water flow continues through the line 664, to the inlet 666 of the header 44. Similarly arranged flow circuit components 671—677 are provided for the similar tubes of the lower part of the S unit.

The primary furnace chamber floor 25 of each major unit B and S, has a slag tap opening 680 through which slag descends through a passage 682, the lower parts of the walls of which constitute an extension 684 of the pressure vessel walls. The passage 682 freely communicates at its lower end with the top of a smaller pressure vessel 686, joined in pressure tight relationship to the extension 684 and having therein a water level, as indicated at 688. A pipe 690 extends downwardly from the pressure vessel 686 to the larger pressure vessel 692, in the form of a tank having an outlet pipe 694. The pipe 690 is provided with a gate 696, and there is a similar gate 698 in the pipe 694. Assuming that both of the gates 696 and 698 are closed, that the associated cyclone furnaces are operated, and that such operation causes slag to pass through the opening 680, slag will accumulate beneath the water level in the pressure vessel or tank 686. When sufficient slag has accumulated therein, the gate 696 is opened and the water and slag particles drop into the pressure vessel or tank 692, both of the tanks or pressure vessels 686 and 692 being so constructed and arranged that there will be no substantial reduction in pressure within the cyclone furnace, or the connected parts of the units B and S when the gate 696 is opened. After the tank 686 is emptied, the gate 696 is closed and the tank 686 is filled with water up to the indicated water level. Thereupon the gate 698 may be opened to allow the accumulated slag and water to fall to a slag disposal zone.

Although the invention has been described with reference to the details of preferred embodiments, it is to be understood that the invention is not to be considered as limited to all of the details thereof. It is rather to be taken as of a scope commensurate with the scope of the subjoined claims.

It is to be appreciated, for instance, that the conditions of use of the invention referred to in the specification are given by way of example. Although fluid pressures of the order of 1800 or 2000 p.s.i.a. have been given, it is to be appreciated that certain aspects of the invention might be particularly advantageous in higher pressure operations, such as those involved in the use of supercritical pressure steam generating units.

What is claimed is:

1. A shop-assembled supercharged forced flow vapor generating and superheating unit comprising means forming a pair of pressure vessels each having a gas outlet, a vapor generating section in each of said vessels, means for supplying a vaporizable fluid in parallel flow relation to said vapor generating sections of said vessels, a vapor superheating section in each of said vessels, with the heat exchange surface of one of said vessels being predominantly vapor generating surface and the heat exchange surface of the other vessel being predominantly vapor superheating surface, means connecting the vapor superheating section of said one vessel for series flow of fluid from the vapor generating sections of both of said vessels and to the vapor superheating section of the other vessel, means for independently firing each of said vessels and providing for the corresponding vessel a flow of heating gases therethrough and over the vapor generating and superheating sections to the gas outlet, while maintaining a gas pressure throughout the gas flow path of each vessel of at least a plurality of atmospheres, and means serially connecting the gas outlet of said one vessel to the other vessel and serially conducting a substantial portion of only the gas discharge from said one vessel to a position upstream gas-wise of the vapor superheating section of the other vessel for mixing and flow with the freshly generated heating gases in said other vessel.

2. A shop-assembled supercharged forced flow vapor generating and superheating unit comprising means forming a pair of pressure vessels each having a gas outlet, a vapor generating section in each of said vessels, means for supplying a vaporizable fluid in parallel flow relation to said vapor generating sections of said vessels, a vapor superheating section in each of said vessels, with the heat exchange surface of one of said vessels being predominantly vapor generating surface and the heat exchange surface of the other vessel being predominantly vapor superheating surface, means connecting the vapor superheating section of said one vessel for series flow of fluid from the vapor generating sections of both of said vessels and to the vapor superheating section of the other vessel, means for independently firing each of said vessels and providing for the corresponding vessel a flow of heating gases therethrough and over the vapor generating and superheating sections to the gas outlet, while maintaining a gas pressure throughout the gas flow path of each vessel of at least a plurality of atmospheres, means serially connecting the gas outlet of said one vessel to the other vessel and serially conducting a substantial portion of only the gas discharge from said one vessel to a position upstream gas-wise of the vapor superheating section of the other vessel for mixing and flow with the freshly generated heating gases in said other vessel, and means conducting the remaining portion of the gas discharge from said one vessel to a position upstream gas-wise of the vapor superheating section of said one vessel for mixing and flow with the freshly generated heating gases in said one vessel.

3. A shop-assembled supercharged forced flow vapor generating and superheating unit comprising means forming a pair of pressure vessels each having a gas outlet, a vapor generating section in each of said vessels, means for supplying a vaporizable fluid in parallel flow relation to said vapor generating sections of said vessels, a vapor superheating section in each of said vessels, with the heat exchange surface of one of said vessels being predominantly vapor generating surface and the heat exchange surface of the other vessel being predominantly vapor superheating surface, means connecting the vapor superheating section of said one vessel for series flow of fluid from the vapor generating sections of both of said vessels and to the vapor superheating section of the other vessel, means for independently firing each of said vessels and providing for the corresponding vessel a flow of heating gases therethrough and over the vapor generating and superheating sections to the gas outlet, while maintaining a gas pressure throughout the gas flow path of each vessel of at least a plurality of atmospheres, means serially connecting the gas outlet of said one vessel to the other vessel and serially conducting a substantial portion of only the gas discharge from said one vessel to a position upstream gas-wise of the vapor superheating section of the other vessel for mixing and flow with the freshly generated heating gases in said other vessel, means conducting the remaining portion of the gas discharge from said one vessel to a position upstream gas-wise of the vapor superheating section of said one vessel for mixing and flow with the freshly generated heating gases in said one vessel, a third pressure vessel having a gas outlet, said vaporizable fluid supply means including an economizer disposed in said third pressure vessel and connected for flow of fluid to the vapor generating section of each of said pair of pressure vessels, and means connecting the gas outlet of said other vessel to said third vessel and conducting a substantial portion of the gas discharge from said other vessel to a position upstream gas-wise of said economizer for flow through said third vessel and over the economizer to the gas outlet of said third vessel.

4. A fluid heating unit having a vertically elongated pressure vessel of circular cross-section constructed to withstand pressures of at least several atmospheres said vessel having a lower furnace section and an upper convection fluid heating section having a heating gas outlet therefrom, means for pressure firing furnace section and providing an upward flow of heating gases therein, means including closely spaced fluid heating tubes defining an imperforate annular baffle spaced inwardly of and adjacent to the pressure vessel wall and arranged to define therebetween an annular gas pass opening adjacent its lower end to said furnace section, said annular baffle extending along most of the length of the furnace section and the convection fluid heating section, a series of radially arranged fluid heating tube platens disposed within said annular baffle and above the furnace section and arranged to be contacted by high temperature heating gases passing from said furnace section to said heating gas outlet, and means for supplying a low temperature gas to said annular gas pass at a temperature considerably less than the temperature of the freshly generated heating gases and effecting a flow of the low temperature gas through said annular gas pass to the furnace section at a pressure at least equal to the gas pressure in said furnace section for mixing with the freshly generated heating gases.

5. A fluid heating unit having a vertically elongated pressure vessel of circular cross-section constructed to withstand pressures of at least several atmospheres, said vessel having a lower furnace section and an upper convection fluid heating section having a heating gas outlet therefrom, means for pressure firing said furnace section and providing an upward flow of heating gases therein, means including closely spaced fluid heating tubes defining an imperforate annular baffle spaced inwardly of and adjacent to the pressure vessel wall and arranged to define therebetween an annular gas pass opening adjacent its lower end to said furnace section, said annular baffle extending along most of the length of the furnace section and the convection fluid heating section, a series of radially arranged fluid heating tube platens disclosed within said annular baffle and above the furnace section and arranged to be contacted by high temperature heating gases passing from said furnace section to said heating gas outlet, and means for recirculating low temperature gas from said heating gas outlet to said annular gas pass at a temperature considerably less than the temperature of the freshly generated heating gases and effecting a flow of the low temperature gas through said annular gas pass to the furnace section at a pressure at least equal to the gas pressure in said furnace section for mixing with the freshly generated heating gases.

6. A fluid heating unit having a vertically elongated pressure vessel of circular cross-section constructed to withstand pressures of at least several atmospheres, said vessel having a lower furnace section and an upper convection fluid heating section having a heating gas outlet therefrom, means for pressure firing said furnace section and providing an upward flow of heating gases therein, means including closely spaced fluid heating tubes defining an imperforate annular baffle spaced inwardly of and adjacent to the pressure vessel wall and arranged to define therebetween an outer annular gas pass opening adjacent its lower end to said furnace section, said annular baffle extending along most of the length of the furnace section and the convection fluid heating section, a circular row of closely spaced fluid heating tubes arranged to form an inner circular baffle cooperating with said annular baffle to define an inner annular gas pass receiving heating gases from said furnace section, a series of radially arranged fluid heating tube platens disposed in said inner annular gas pass and above the furnace section and arranged to be contacted by high temperature heating gases passing from said furnace section to said heating gas outlet, and means for supplying a low temperature gas to said outer annular gas pass at a temperature considerably less than the temperature of the freshly generated heating gases and effecting a flow of the low temperature gas through said outer annular gas pass to the furnace section at a pressure at least equal to the gas pressure in said furnace section for mixing with the freshly generated heating gases.

7. A supercharged fluid heating unit having a forced circulation fluid heating system and comprising walls forming a vertically elongated pressure vessel of circular cross-section constructed to withstand pressures of at least several atmospheres, said vessel having a lower furnace section and an upper convection heating section having a heating gas outlet therefrom, means including closely spaced fluid heating tubes forming an annular baffle spaced inwardly of and adjacent to the pressure vessel and cooperating with said vessel to form an annular gas pass therebetween opening adjacent its lower end to said furnace section, said annular baffle extending along most of the length of the furnace section and the convection fluid heating section, means for pressure firing said furnace section and providing an upward flow of heating gases therein at a pressure of at least a plurality of atmospheres, a series of radially arranged serially connected fluid heating tube platens of progressively different lengths disposed within said annular baffle and above the furnace section and arranged to be contacted by the high temperature heating gases passing from said furnace section to said heating gas outlet, with the platens being so arranged that the gas flow spaces between circumferentially successive platens decrease in width as gas flow progresses and with the platens being so serially connected that the fluid flows first through the longest platens and then progressively through the next shorter platens, means for connecting said baffle tubes and said platens into said forced circulation system, and means for supplying a low temperature gas to said annular gas pass and effecting a flow of the low temperature gas through said annular gas pass to the furnace section at a pressure at least equal to the gas pressure in said furnace section for mixing with the freshly generated heating gases.

8. A supercharged fluid heating unit having a forced circulation fluid heating system and comprising walls forming a vertically elongated pressure vessel of circular cross-section constructed to withstand pressures of at least several atmospheres, said vessel having a lower furnace section and an upper convection heating section having a heating gas outlet therefrom, means including closely spaced fluid heating tubes forming an annular baffle spaced inwardly of and adjacent to the pressure vessel and cooperating with said vessel to form an annular gas pass therebetween opening adjacent its lower end to said furnace section, said annular baffle extending along most of the length of the furnace section and the convection fluid heating section, means for pressure firing said furnace section and providing an upward flow of heating gases therein at a pressure of at least a plurality of atmospheres, a series of radially arranged serially connected fluid heating tube platens of progressively different lengths disposed within said annular baffle and above the furnace section and arranged to be contacted by the high temperature heating gases passing from said furnace section to said heating gas outlet and connected for series flow of fluid from said baffle wall tubes, each platen including a plurality of nested U-tubes with their axes arranged in a single radially and vertically disposed plane, with the platens being so arranged that the gas flow spaces between circumferentially successive platens decrease in width as gas flow progresses and with the platens being so serially connected that the fluid flows first through the longest platens and then progressively through the next shorter platens, means for connecting said baffle tubes and said platens into said forced circulation system, and means for supplying a low temperature gas to said annular gas pass and effecting a flow of the low temperature gas through said annular gas pass to the furnace section at a pressure at least equal to the gas pressure in said furnace section for mixing with the freshly generated heating gases.

9. A supercharged fluid heating unit having a forced circulation fluid heating system and comprising walls forming a vertically elongated pressure vessel of circular cross-section constructed to withstand pressures of at least several atmospheres, said vessel having a lower furnace section and an upper convection heating section having a heating gas outlet therefrom, means including closely spaced vapor generating tubes forming an annular baffle spaced inwardly of and adjacent to the pressure vessel and cooperating with said vessel to form an annular gas pass therebetween opening adjacent its lower end to said furnace section, said annular baffle extending along most of the length of the furnace section and the convection fluid heating section, means for pressure firing said furnace section and providing an upward flow of heating gases therein at a pressure of at least a plurality of atmospheres, a series of radially arranged serially connected vapor superheating tube platens of progressively different lengths disposed within said annular baffle and above the furnace section and arranged to be contacted by the high temperature heating gases passing from said furnace section to said heating gas outlet and connected for series flow of fluid from said baffle wall tubes, with the platens being so arranged that the gas flow spaces between circumferentially successive platens decrease in width as gas flow progresses and with the platens being so serially connected that the fluid flows first through the longest platens and then progressively through the next shorter platens, means for connecting said baffle tubes and said platens into said forced circulation system, and means for supplying a low temperature gas to said annular gas pass and effecting a flow of the low temperature gas through said annular gas pass to the furnace section at a pressure at least equal to the gas pressure in said furnace section for mixing with the freshly generated heating gases.

References Cited in the file of this patent

UNITED STATES PATENTS

| | | |
|---|---|---|
| 1,978,837 | Forsling | Oct. 30, 1934 |
| 2,229,643 | deBaufre | Jan. 28, 1941 |
| 2,477,950 | Bailey | Aug. 2, 1949 |
| 2,568,024 | Pfenninger | Sept. 18, 1951 |
| 2,568,787 | Bosch | Sept. 25, 1951 |
| 2,608,959 | Woolley | Sept. 2, 1952 |
| 2,663,146 | Legendre | Dec. 22, 1953 |
| 2,672,849 | Fruit | Mar. 23, 1954 |
| 2,681,641 | Andrew et al. | June 22, 1954 |
| 2,685,279 | Caracristi | Aug. 3, 1954 |
| 2,715,019 | Walter | Aug. 9, 1955 |
| 2,725,042 | Schroeder | Nov. 29, 1955 |
| 2,730,080 | Stallkamp | Jan. 10, 1956 |
| 2,781,746 | Armacost et al. | Feb. 19, 1957 |
| 2,809,616 | Black | Oct. 15, 1957 |
| 2,815,007 | Sprague | Dec. 3, 1957 |

FOREIGN PATENTS

| | | |
|---|---|---|
| 211,358 | Switzerland | Dec. 2, 1940 |